(12) United States Patent
Farah

(10) Patent No.: US 7,593,911 B1
(45) Date of Patent: Sep. 22, 2009

(54) SYSTEM AND METHOD FOR APPLYING RULE SETS AND RULE INTERACTIONS

(75) Inventor: Jeffrey Farah, North Brunswick, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/250,070

(22) Filed: Oct. 12, 2005

(51) Int. Cl.
*G06F 17/00* (2006.01)
*G06N 5/02* (2006.01)

(52) U.S. Cl. ........................................ 706/47
(58) Field of Classification Search .............. 706/45–47
See application file for complete search history.

(56) References Cited

U.S. PATENT DOCUMENTS

| | | | |
|---|---|---|---|
| 6,363,494 B1 | 3/2002 | Farah | |
| 6,456,993 B1 * | 9/2002 | Freund | 706/46 |
| 6,697,791 B2 | 2/2004 | Hellerstein et al. | |
| 6,826,698 B1 | 11/2004 | Minkin et al. | |
| 6,836,766 B1 * | 12/2004 | Gilpin et al. | 706/1 |
| 6,898,586 B1 | 5/2005 | Hlava et al. | |
| 6,924,828 B1 | 8/2005 | Hirsch | |
| 6,938,072 B2 | 8/2005 | Berman et al. | |
| 6,944,604 B1 | 9/2005 | Majoor | |
| 6,952,690 B2 * | 10/2005 | Lumpp et al. | 706/47 |
| 6,952,718 B2 | 10/2005 | Nakamura et al. | |
| 7,280,540 B2 * | 10/2007 | Halme et al. | 370/392 |
| 7,293,238 B1 * | 11/2007 | Brook et al. | 715/736 |
| 7,308,484 B1 * | 12/2007 | Dodrill et al. | 709/218 |
| 7,313,825 B2 * | 12/2007 | Redlich et al. | 726/27 |
| 7,315,826 B1 * | 1/2008 | Guheen et al. | 705/7 |
| 7,320,016 B2 * | 1/2008 | Walsh et al. | 709/200 |
| 7,321,556 B1 * | 1/2008 | Parekh et al. | 370/232 |
| 7,322,047 B2 * | 1/2008 | Redlich et al. | 726/27 |
| 7,325,027 B2 * | 1/2008 | Grow et al. | 709/201 |
| 7,333,484 B2 * | 2/2008 | Henderson et al. | 370/389 |
| 7,349,880 B1 * | 3/2008 | Kitao | 705/37 |
| 7,349,987 B2 * | 3/2008 | Redlich et al. | 709/244 |
| 7,356,585 B1 * | 4/2008 | Brook et al. | 709/224 |
| 7,362,701 B2 * | 4/2008 | Marejka et al. | 370/230 |
| 7,403,901 B1 * | 7/2008 | Carley et al. | 705/2 |
| 7,404,177 B1 * | 7/2008 | Greenfield et al. | 717/106 |
| 7,406,270 B2 * | 7/2008 | Miyazawa et al. | 399/8 |
| 7,406,454 B1 * | 7/2008 | Liu et al. | 706/45 |
| 7,415,510 B1 * | 8/2008 | Kramerich et al. | 709/219 |
| 7,430,755 B1 * | 9/2008 | Hughes et al. | 726/3 |
| 7,437,408 B2 * | 10/2008 | Schwartz et al. | 709/204 |

(Continued)

OTHER PUBLICATIONS

"An algorithm for identification of relations among rules" Marathe, H.; Ma, T.-K.; Liu, C.-C.; Tools for Artificial Intelligence, 1989. Architectures, Languages and Algorithms. IEEE International Workshop on Oct. 23-25, 1989 pp. 360-367.*

(Continued)

*Primary Examiner*—Michael B Holmes

(57) ABSTRACT

Described is a system and method for determining relationships between a plurality of existing rules in a rule set, wherein the relationships include cause interactions and effect interactions among the existing rules, creating a representation of the relationships including the cause interactions and effect interactions, receiving a new rule to be inserted into the rule set and determining if a conflict is created by insertion of the new rule in the rule set.

19 Claims, 4 Drawing Sheets

U.S. PATENT DOCUMENTS

| | | | | |
|---|---|---|---|---|
| 7,441,697 | B2 * | 10/2008 | Fletcher | 235/380 |
| 7,448,081 | B2 * | 11/2008 | Balissat et al. | 726/15 |
| 7,448,538 | B2 * | 11/2008 | Fletcher | 235/380 |
| 7,464,333 | B2 * | 12/2008 | Yamamoto | 715/273 |
| 7,467,198 | B2 * | 12/2008 | Goodman et al. | 709/223 |
| 2005/0038764 | A1 * | 2/2005 | Minsky et al. | 706/47 |

OTHER PUBLICATIONS

Firewall Compressor: An Algorithm for Minimizing Firewall Policies Liu, A.X.; Torng, E.; Meiners, C.R.; INFOCOM 2008. The 27th Conference on Computer Communications. IEEE Apr. 13-18, 2008 pp. 176-180 Digital Object Identifier 10.1109/INFOCOM.2008.44.*

Dynamic Balancing of Packet Filtering Workloads on Distributed Firewalls Guanhua Yan; Songqing Chen; Eidenbenz, S.; Quality of Service, 2008. IWQoS 2008. 16th International Workshop on Jun. 2-4, 2008 pp. 209-218 Digital Object Identifier 10.1109/IWQOS.2008.30.*

XML based open tool for anomalies detection in firewall filtering rules Benelbahri, M.A.; Bouhoula, A.; Trabelsi, Z.; Innovations in Information Technology, 2007. Innovations '07. 4th International Conference on Nov. 18-20, 2007 pp. 163-167 Digital Object Identifier 10.1109/IIT.2007.4430449.*

Handling Anomalies in Distributed Firewalls Bouhoula, A.; Trabelsi, Z.; Innovations in Information Technology, 2006 Nov. 2006 pp. 1-5 Digital Object Identifier 10.1109/Innovations.2006.301921.*

* cited by examiner

SYSTEM AND METHOD FOR APPLYING RULE SETS AND RULE INTERACTIONS

BACKGROUND

One of the most significant parts in a system based upon rules is the rules themselves and the interactions among the rules when determining whether to allow actions to occur. One manner of organizing rules is into tables or trees so that a sequential evaluation approach is employed. For every new object entering the system, the rules are searched until a rule that matches the object's parameters is found. Another manner of organizing rules is into rule sets so that an object that satisfies the parameters of a rule set would enter those set of rules for evaluation purposes. This provides further options such as applying policies to individual or multiple users at once. Once an object satisfies the parameters of the rule set, the rules within that rule set would be applied to the object in a similar manner as done with the table or tree rule organization. In both methods, when a new rule is introduced, it is simply added into the system and the rule is addressed upon a new object entering the system.

The methods described above utilize a system where all rules or those rules comprising a rule set must be addressed to evaluate an object that enters the system. However, it has been demonstrated that in a rule based system, there is typically a relationship between the rules that allows one rule to be engaged as a result of the execution of another rule. Currently, the methods of rule organization do not take into account the interconnecting relationship of rules in a system. This creates additional problems that may become very difficult to rectify, particularly if a new rule needs to be incorporated that has unknown conflicts with existing rules. A need exists for a method to incorporate not just the rules and their parameters but also the relationships involved between the rules allowing greater control over maintenance of the system.

SUMMARY OF THE INVENTION

A method for determining relationships between a plurality of existing rules in a rule set, wherein the relationships include cause interactions and effect interactions among the existing rules, creating a representation of the relationships including the cause interactions and effect interactions, receiving a new rule to be inserted into the rule set and determining if a conflict is created by insertion of the new rule in the rule set.

A system having an analyzing module to analyze the relationships between a plurality of existing rules in a rule set, wherein the relationships include cause interactions and effect interactions among the existing rules, a representation module to create a representation of the relationships including the cause interactions and effect interactions, a receiving module to receive a new rule to be inserted into the rule set and a new rule analyzing module to analyze if a conflict is created by insertion of the new rule in the rule set.

A system including a memory to store a set of instructions and a processor to execute the set of instructions. The set of instructions being operable to determine relationships between a plurality of existing rules in a rule set, wherein the relationships include cause interactions and effect interactions among the existing rules, create a representation of the relationships including the cause interactions and effect interactions, receive a new rule to be inserted into the rule set and determine if a conflict is created by insertion of the new rule in the rule set.

DETAILED DESCRIPTION

Figure 1:
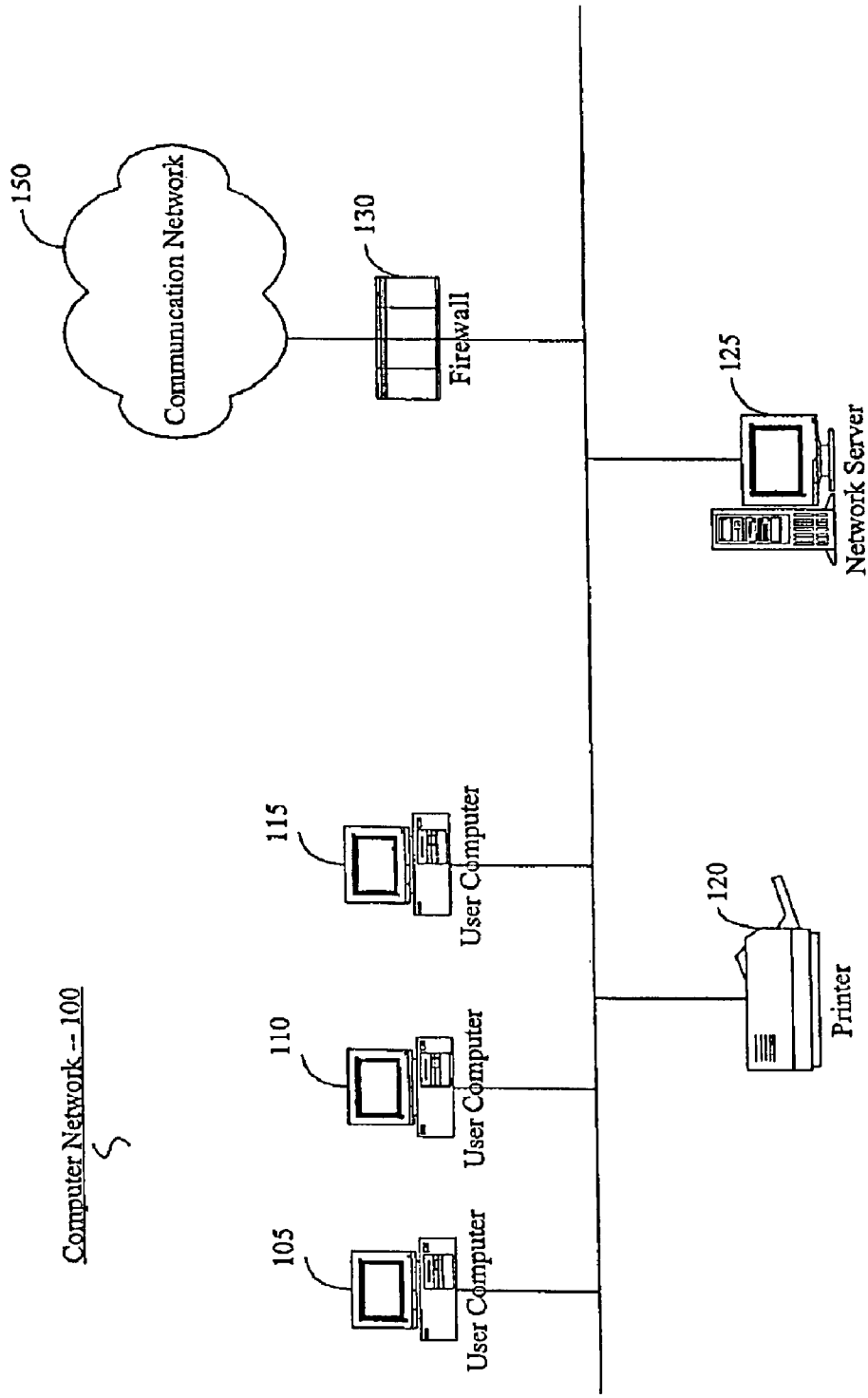
FIG. 1 shows an exemplary network system, on which an exemplary embodiment of the present invention may be implemented.

The present invention may be further understood with reference to the following description and the appended drawings, wherein like elements are referred to with the same reference numerals. The exemplary embodiment of the present invention describes a method for organizing rules and adjusting rules in a computer network security system through use of a firewall. The firewall, by its nature, is a rule based system that functions only if rules are inputted into it so that it may evaluate network objects that enter it. The rules, computer network, and firewall will be discussed in detail below.

However, those of skill in the art will understand that the use of firewalls is only exemplary and that the present invention may be applied to any type of rule based system that may utilize a set of rules in order to function. Other examples of rule based systems include intelligence systems (systems that create its own subsequent pathways through inputs from its environment), money management systems (systems that maintain portfolios through inputs by users), etc. These systems also contain rules or rule sets that exhibit connections among each other.

In terms of the exemplary embodiment in which the invention may operate, a computer network is continuously transmitting and/or receiving information, whether it is between computers (or other network devices) or between interconnected networks. The transmission of information takes the form of a network object. Those of skill in the art will understand that the information may be formatted in various manners based on the networking protocol used in the individual network. However, the format of the information transmitted and/or received in the network is not relevant to the exemplary embodiment of the present invention. Thus, the generic term "network object" will be used to describe any data/information. This transmission of information requires a form of control so that sensitive or unwanted information is not transmitted and/or received. The control medium must be able to determine what information is sensitive or unwanted.

Typically, each computer network is configured to allow different types of information to be transmitted and/or received, e.g., a first network may accept certain information, while other networks may not allow the same information to be received within the networks. Users within the computer network may also have different criteria in terms of what information can and cannot be transmitted and/or received. This requires maintenance for all the needs of each individual network and its users.

Typically, a system administrator is charged with maintaining the system and would know what rules are involved within the system. However, if the system administrator also knew the rule interactions involved, then a better understanding of network operations may be had. Through the exemplary embodiments of the present invention that incorporates a representation of the rules and their interactions, a system administrator would be able to easily maintain the transmission of information throughout the computer network on a larger scale by being able to directly see and utilize an overall image of the rules and the rule interactions involved.

FIG. 1 illustrates an exemplary computer network 100 in which an exemplary embodiment of the present invention may be implemented. A computer network is a system for communication among computing devices connected to the network or other networks. Computers are linked together so that information can be freely passed among them. For example, a computer network can be utilized to maintain a central database that all terminals connected to it would be able to access. If not for the network, each individual change to the database would not be registered until manually updated by the user. In addition, each update would only affect the changes made by one user that may create several versions of the database. Again, the central database serves merely as an example of when information would be passed within a computer network.

FIG. 1 shows an exemplary computer network 100 including a plurality of user computers 105-115, a printer 120, a network server 125 and a firewall 130. The firewall 130 connects the computer network 100 with another communication network 150, e.g., the Internet, a separate company Intranet, a Virtual Private Network ("VPN"), a proprietary network, etc. Those of skill in the art will understand that the computer network 100 is only exemplary and that the exemplary embodiments of the present invention may be applied to any rule based system.

The devices connected to the computer network 100 (e.g., user computers 105-115, the printer 120, the network server 125) may communicate and exchange information according to the network protocols. These devices may also need or desire to communicate with other devices that are not directly connected to the computer network 100. Thus, these devices may use the communication network 150 to communicate with other devices not directly connected to the computer network 100. However, because these other devices are outside the control of the computer network 100, the owner (or manager) of the computer network 100 may not be confident about the content of the data that is transmitted and/or received via the communication network 150.

Thus, the firewall 130 is used to screen the incoming data (or the outgoing data) so that improper content is not received by and/or transmitted from the computer network 100. The firewall 130 provides the computer network 100 with a certain level of security so that the computer network 100 is not compromised by incoming data and/or outgoing data. Those of skill in the art will understand that a computer network may include any number of firewalls and that firewalls may be placed in other locations within the computer network. In addition, the firewall 130 is shown as a separate device on the computer network 100. Typically, a firewall is a software application that is executed by a network device such as a network server or a network appliance. The manner in which the firewall 130 is illustrated in FIG. 1 is only to show the general layout of the computer network.

There are different types of firewalls such as a network layer firewall, an application layer firewall, or a proxy firewall and the exemplary embodiment of the present invention may be applied to any type of firewall. A network layer firewall does not allow packets of information to pass through unless they match a set of rules defined in the firewall. An application layer firewall intercepts all packets of information traveling to or from an application, as a consequence preventing all unwanted outside traffic from reaching protected machines. A proxy firewall responds to input packets of information in the manner of an application, while blocking other packets.

The three types of firewalls described above control the traffic of information by utilizing a set of rules. If the information satisfies the set of rules implemented in the firewall, the information will be permitted to pass the firewall to its destination. However, if the information violates the set of rules, then it will be denied any further access and not reach its intended destination. With technology continuously changing, certain unwanted information may eventually pass through a firewall. For example, a rule may indicate that all information containing obscene language be blocked. Through different coding mechanisms, the information packet sent may disguise the obscene language and satisfy the criteria of the rules and pass through the firewall. A new rule would then have to be implemented in the firewall to address this new form of information transmission. Again, the present invention may be applied to any firewall including a network layer firewall, an application layer firewall, or a proxy firewall since firewalls function by incorporating rules.

Figure 2:
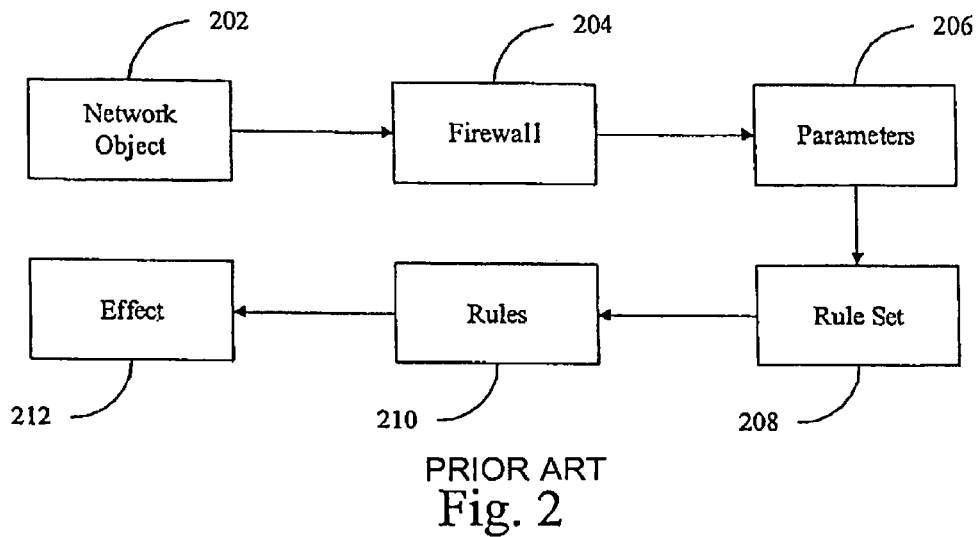
FIG. 2 shows an exemplary pathway a network object takes through a firewall.

FIG. 2 illustrates an exemplary path of how a firewall 204 would interpret a network object 202. As previously discussed, a more practical method of using rules to provide more options is to separate all the rules of a system and place them within rule sets (e.g., rule set 208). The rules 210 do not represent all the rules of the firewall 204 but represents one group of rules that are contained within the firewall 204. The firewall 204 would address the predefined parameters 206. The rule set 208 would incorporate some of the characteristic parameters contained within the predefined parameters 206. If the network object 202 addresses the parameters of a particular rule set, then the network object 202 would be sent toward that rule set 208. The network object 202 would then address all the rules 210 of that rule set 208 and an appropriate effect 212 would result.

Figure 3:
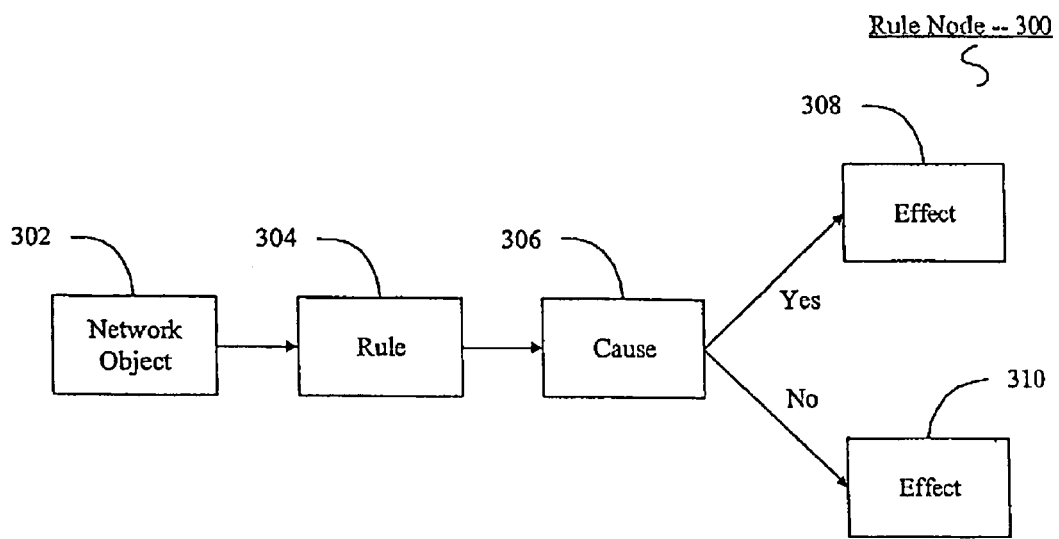
FIG. 3 shows an exemplary embodiment of a rule node and its constituent parts.

FIG. 3 illustrates a rule node 300 broken down into its constituent parts. A rule node (rule node 300) is created when a rule is placed with a cause and effect pairing. A network object 302 enters the rule node 300 first by going to a rule 304. A rule is a prescribed direction for conduct. Rules restrict the type of activity that a machine may perform. As stated above, rules can be grouped into rule sets which contain rules to be addressed for particular objects that enter the system satisfying the rule sets' parameters. A rule set can be described as a series of Artificial Intelligence (AI) predicates. Predicates would be one element within the series of a rule set.

Predicates can be further separated into two groups for any rule: a cause group (cause 306) and an effect (or results) group (effect 308 and effect 310). Upon the network object 302 addressing the rule 304, a cause group 306 is triggered. The cause 306 interprets how the network object 302 addresses the rule 304 thus determining if the proper effect is the effect 308 or the effect 310.

Once triggered, depending on how the network object 302 responded to the rule 304, an effect 308 or an effect 310 will be activated. If the rule 304 is violated, the effect 308 is triggered so that the network object 302 is taken to another location. If the rule 304 is not violated, the effect 310 is triggered so that a network object 302 is taken to a different location. The effects 308 and 310 in this exemplary embodiment represent the directions of the pathway illustrated in FIG. 4 (i.e. arrows leading from rule 404 to rule 406 or rule 408).

Figure 4:
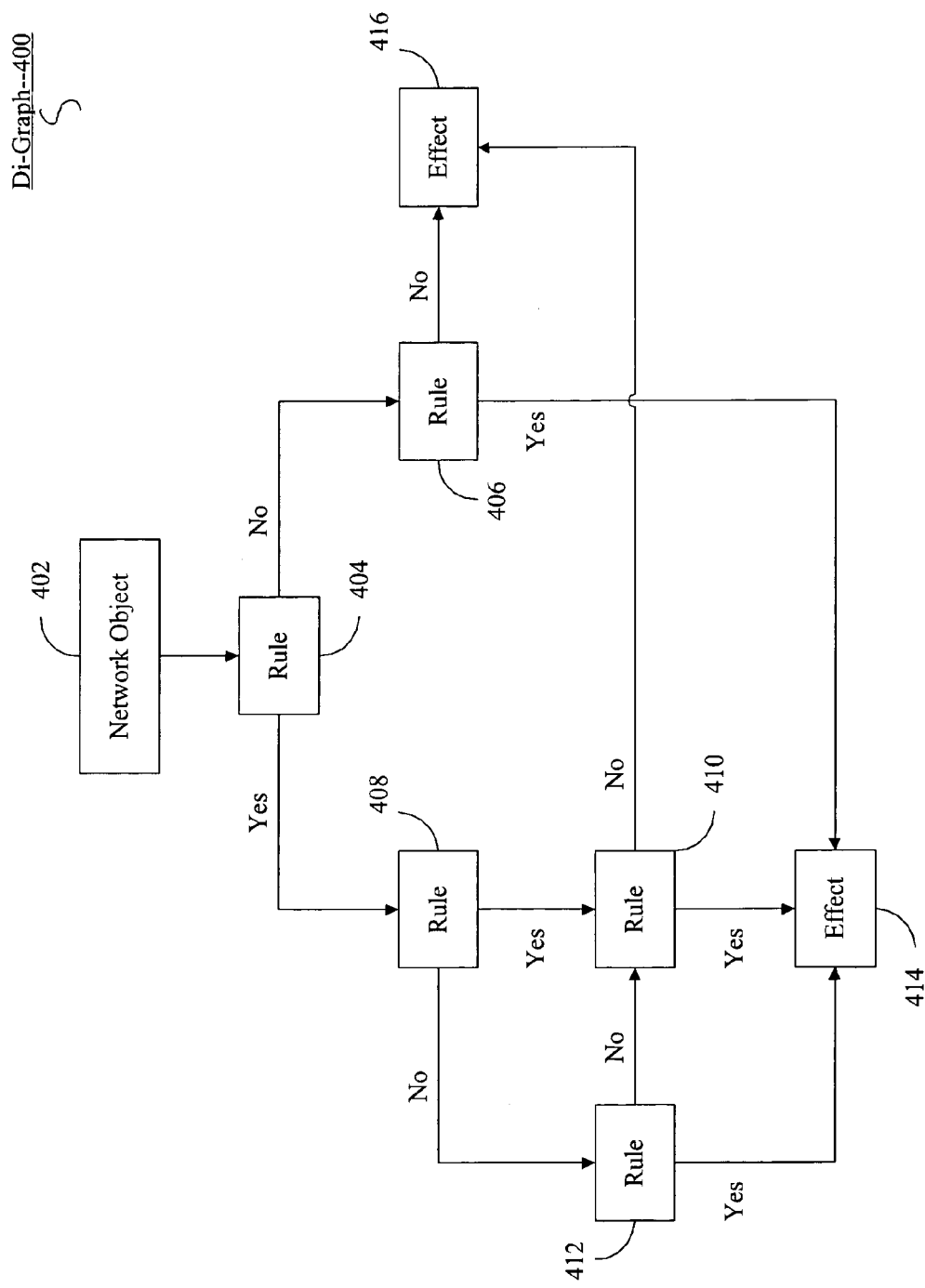
FIG. 4 shows an exemplary embodiment of a display by use of a directed graph demonstrating an exemplary rule set of a rule based system with all of its rules and rule interactions according to the present invention.

FIG. 4 illustrates a directed graph ("di-graph") 400 incorporating a rule set and its individual rule interactions. A di-graph is a diagram composed of vertices and arrows called arcs going from one vertex to another vertex. A vertex (e.g., rule 404, rule 406) is representative of a rule in a rule set and the arcs (e.g., arrows connecting rule 404 to rule 406 or rule 408) are representative of the interaction and/or the cause-effect relationship between the rules. The vertices represent the rule itself, and then based upon the outcome of how the rule applies to the network object, the arc represents the direction toward the next rule to be addressed. This way, through the di-graph representation, it becomes clear which rules are reachable from other rules (e.g., rule 410 is reachable through rule 408 or rule 412).

Di-graph 400 shows how rules are interconnected among each other and how one rule's effect can trigger another rule. It has been demonstrated that for any set of rules (e.g., rule set 208 in FIG. 2), there is typically a relationship between the rules that allows one rule to be engaged as a result of the execution of another rule. For example, as embodied in FIG. 4, rule 408 is triggered by a network object 402 violating rule 404. Thus, a network object will trigger a rule of the firewall that will in turn trigger another rule and so on until a final effect is reached, thus creating a series of AI predicates (discussed with reference to FIG. 3).

The rules (e.g., rule 404, rule 406) contained in the di-graph will be organized according to the administrator's protocol. For example, the first rule (rule 404) that is encountered is a generic rule that is either violated or not violated. More specific rules (e.g., rule 406, rule 408) would follow where a different path is created depending on whether the rules along that path were violated or not violated. Eventually, no more rules need be addressed and a determination of whether that network object should be allowed to pass the firewall will be made (effect 414, effect 416). As shown in the di-graph 400, every rule does not have to be addressed as each network object that is evaluated by the rule set corresponding to the di-graph 400 would follow its own independent path along the di-graph 400 resulting in the desired outcome (effect 414 or effect 416). Thus, a properly constructed rule set may be represented as a di-graph showing the interactions (cause-effect relationships) between the rules in the rule set.

The following will describe the exemplary interaction among the rules represented by the di-graph 400 when a network object 402 is inputted into the rule set. Depending on whether the network object 402 violates a rule 404, a path would be taken leading to another rule. If the rule 404 is violated, the network object 402 would be directed towards a rule 408. If directed toward the rule 408 and if the network object 402 violated the rule 408, then it would be directed toward a rule 410. If directed toward the rule 408 and if the network object 402 did not violate the rule 408, then it would be directed toward a rule 412. If directed toward the rule 412 and if the network object 402 violated the rule 412, then it would be directed toward an effect 414. The effect 414 may be, for example, not to allow the network object to pass through the firewall. If directed toward the rule 412 and if the network object 402 did not violate the rule 412, then it would be directed toward the rule 410. If directed toward the rule 410 and if the network object 402 violated the rule 410, then it would be directed toward the effect 414. If directed toward the rule 410 and if the network object 402 did not violate the rule 410, then it would be directed toward an effect 416. The effect 416 may be the converse of the effect 414, e.g., allow the data object to pass.

Going back to if the network object 402 did not violate the rule 404, then the network object 402 would be directed toward a rule 406. If directed toward the rule 406 and if the network object 402 violated the rule 406, then it would be directed toward the effect 414. If directed toward the rule 406 and if the network object 402 did not violate the rule 406, then it would be directed toward the effect 416. It should be noted that this is one exemplary embodiment of a possible di-graph. Those of skill in the art will recognize that the di-graph represented in FIG. 4 may become much more complex with the addition of more rules, pathways, and/or effects.

Thus, the digraph 400 shows the interaction among the rules 404-412 resulting in the effects 414 and 416. It should be noted that the rules may also be effects that result from previously applied rules, e.g., the rule 408 is an effect from the applied rule 404. The di-graph 400 shows that all the rules in this particular rule set are working in harmony with each other to produce the desired result. However, there may be instances where rules contradict each other and/or do not work in conjunction with each other (e.g., where a rule leads to multiple inconsistent results.)

This may be especially true when rules are added to a rule set or rule based system. If the system administrator is not aware of the interactions between the currently implemented rules, it will be difficult to add rules because the system administrator will not understand how these new rules will affect the previously implemented rules. The exemplary embodiments of the present invention allow the system administrator to understand how the currently implemented rules interact (e.g., as represented by the di-graphs). The system administrator may then add new rules into the rule set and have these new rules represented in the di-graph. Any contradictions or inconsistencies will become apparent to the system administrator through this representation of the rule set. This technique may also be applicable to the deletion of rules and/or the changing of rules within the rule set, i.e., any changes in the rule set may be represented in a di-graph to determine if the changes cause a problem with the rule set.

Figure 5:
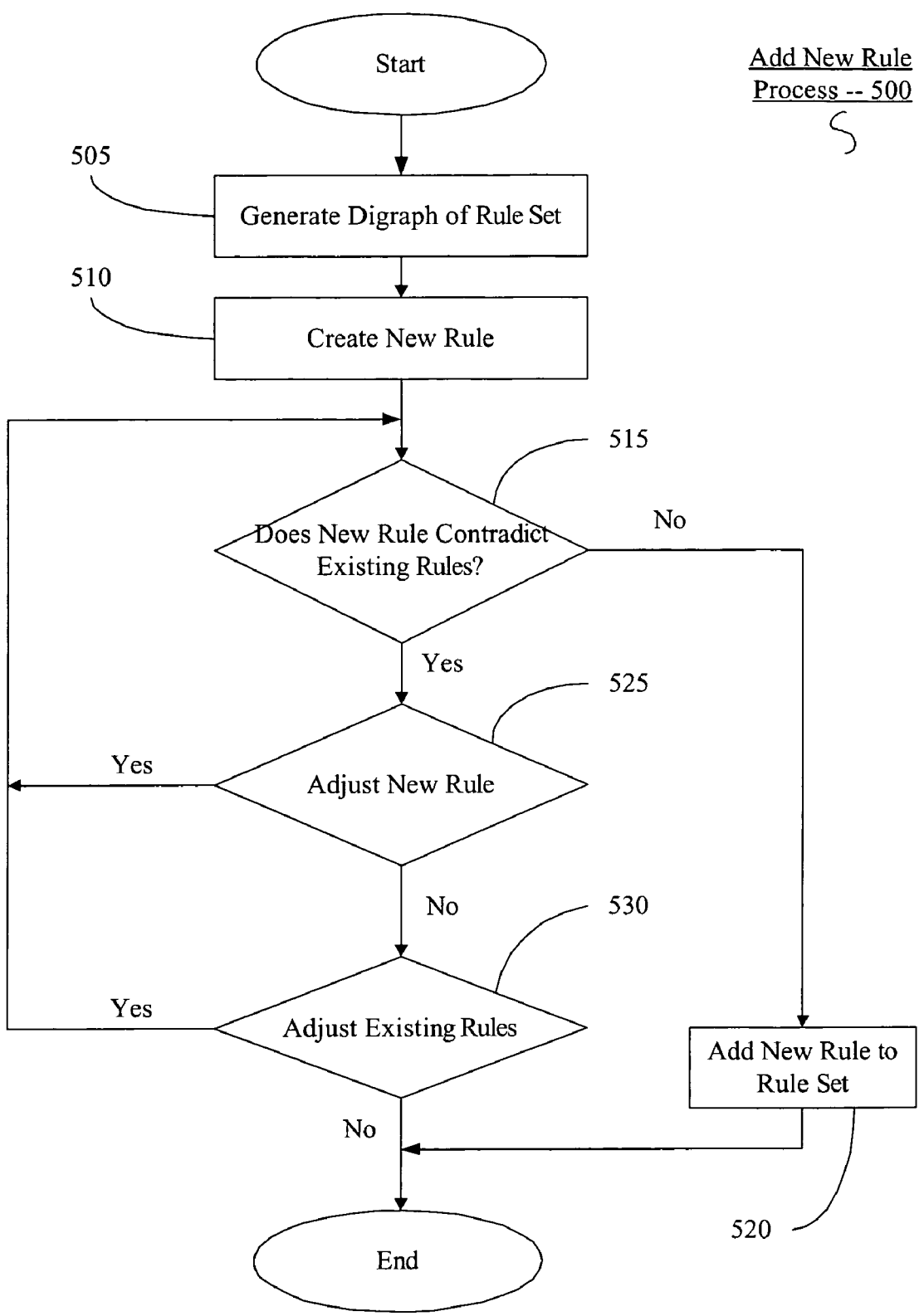
FIG. 5 shows an exemplary process for incorporation of a new rule into a rule based system according to the present invention.

FIG. 5 illustrates a process 500 for addition of a new rule to a rule set. A new rule is a rule that does not exist within the rule set. Thus, the introduction of a new rule may produce contrary or inconsistent results. The use of a representation such as a di-graph, for example (as was illustrated in FIG. 4), will remedy such a problem because the inconsistency and/or contradiction will become readily apparent to the user attempting to implement the new rule.

In step 505, a di-graph of the existing rule set or rule based system may be generated to show the interactions among the currently implemented rules. It should be noted that the step 505 is not specifically required, but may be useful to the system administrator because a view of the rules as currently implemented may save time in that the system administrator may understand the interactions and may refrain from attempting to implement rules that would obviously cause a problem within the rule set. The di-graph 400 shown in FIG. 4 may be an example of a representation of currently implemented rules. This di-graph 400 provides the system administrator with a detailed view of the various interactions among the currently implemented rules.

In step 510, the system administrator creates or adds a new rule to the rule set. In step 515, it is determined whether the new rule creates any problems within the rule set, e.g., creates inconsistencies or contradictions. This determination may be made by adding a representation of the new rule to the di-graph for the rule set. As described above, every rule may be represented in the digraph as a cause-effect relationship among the current rules. The placement of the new rule within the di-graph may be done using the same principals as creating the original di-graph as described above. By placing the new rule within the di-graph, the current rules that are affected by the new rule are easily ascertainable. The di-graph would make clear the effect the proposed new rule has on the rule set.

If, in step 515, the new rule does not present any conflicts with the current rules, the rule may be added to the rule set (step 520) and the process is complete. As described above, the di-graph with the new rule added will provide the system administrator with the interactions of the new rule on the rule set and the interactions of all the rules within the rule set. Thus, the system administrator will understand how the new rule (and the existing rules) are reachable from other rules in the rule set. The overall set of rules, their execution models, etc., become very well known, concisely structured, easily readable and adjustable because of their presentation in the di-graph.

If, in step 515, the new rule presents a conflict with the existing rule set, the process continues to step 525, where the administrator may adjust the new rule to account for the conflict reflected in the di-graph. It should be noted that the contradiction presented by step 515 may be discovered manually by the system administrator, i.e., by the system administrator examining the di-graph for conflicts. In another exemplary embodiment, the di-graph may be generated using software based upon the principles described above and the software may include a function that highlights conflicts to the administrator and/or does not produce a di-graph if there is a conflict between the rules. Thus, in step 525, the system administrator is given the option to adjust the new rule to resolve the conflict. The adjustment may be suggested by the software generating the di-graph because it is aware of the conflicts, or the adjustment may be generated by the system administrator based on the conflicts shown in the di-graph.

If the system administrator adjusts the new rule, the process loops back to step 515 to determine if the adjusted new rule still presents conflicts. If the system administrator chooses not to adjust the new rule, the process continues to step 530, where the system administrator may adjust the existing rules to accommodate the new rule. The adjustments to the existing rules may be performed in the same manner as described above for the new rule. If the system administrator decides to adjust the existing rules, the process loops back to step 515 to determine if the adjusted existing rules and the new rule still present a conflict. If the system administrator decides not to adjust the existing rules, the process ends and the new rule is not added to the rule set because there is an unresolved conflict for the new rule.

While an exemplary embodiment of the present invention describes the system and method within a computer network using a firewall, those of skill in the art will understand that the principles and functionality described herein may be implemented to any rule based system within a software program, a component within a software program, a hardware component, or any combination thereof.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A computer readable storage medium including a set of instructions executable by a processor, that cause the processor to perform a method for screening incoming data of a network, comprising:
    determining relationships between a plurality of existing rules in a rule set of a firewall used to screen the incoming data of the network, wherein the relationships include cause interactions and effect interactions among the existing rules;
    creating a representation of the relationships including the cause interactions and effect interactions;
    receiving a new rule to be inserted into the rule set;
    inserting further relationships between the new rule and the existing rules into the representation to create a modified representation; and
    determining, based on the modified representation, if a conflict is created by insertion of the new rule in the rule set.

2. The computer readable storage medium of claim 1, wherein the determining of the conflict includes:
    determining further cause interactions and further effect interactions of the new rule with the existing rules.

3. The computer readable storage medium of claim 1, comprising:
    adding the new rule to the rule set when the new rule can be added without conflict.

4. The computer readable storage medium of claim 1, wherein the rule set includes parameters used to determine when the rule set is invoked.

5. The computer readable storage medium of claim 1, wherein each rule of the rule set is placed with a cause and effect pairing making a rule node to create the cause interactions and effect interactions.

6. The computer readable storage medium of claim 1, wherein the representation is a di-graph.

7. The computer readable storage medium of claim 6, wherein the di-graph includes vertices where each vertex represents a rule of the rule set and the effects.

8. The computer readable storage medium of claim 6, wherein the di-graph includes arcs where each arc represents one of the cause interactions and the effect interactions.

9. The computer readable storage medium of claim 1, wherein the new rule is a change to one of the existing rules.

10. The computer readable storage medium of claim 1, further comprising:
    indicating the conflict created by the new rule with the existing rules.

11. The computer readable storage medium of claim 1, further comprising:
    suggesting, when the conflict is identified, a new replacement for the new rule within the rule set.

12. The computer readable storage medium of claim 1, wherein the representation is provided in a visual format.

13. A system for screening incoming data of a network, comprising:
    an analyzing module to analyze the relationships between a plurality of existing rules in a rule set of a firewall used to screen the incoming data of the network, wherein the relationships include cause interactions and effect interactions among the existing rules;
    a representation module to create a representation of the relationships including the cause interactions and effect interactions;
    a receiving module to receive a new rule to be inserted into the rule set;
    a new rule analyzing module to analyze if a conflict is created by insertion of the new rule in the rule set by inserting further relationships between the new rule and the existing rules to create a modified representation and determining if a conflict is created based on the modified representation; and
    a display to display the representation and the modified representation to a user of the system.

14. The system of claim 13, wherein the new rule analyzing module determining the conflict includes:
  determining further cause interactions and further effect interactions of the new rule with the existing rules.

15. The system of claim 13, wherein the analyzing module places each rule of the rule set with a cause and effect pairing making a rule node to create the cause interactions and effect interactions.

16. The system of claim 13, wherein the representation module represents the relationships in a di-graph format.

17. The system of claim 13, wherein the receiving module receives a new rule that is a change to one of the existing rules.

18. The system of claim 13, wherein the new rule analyzing module indicates the conflict created by the new rule with the existing rules.

19. The system of claim 13, wherein the new rule analyzing module suggests, when the conflict is identified, a new placement for the new rule within the rule set.

\* \* \* \* \*